(12) United States Patent
Gibson et al.

(10) Patent No.: US 11,280,630 B2
(45) Date of Patent: Mar. 22, 2022

(54) UPDATING MAP DATA (71) Applicant: Zoox, Inc., Foster City, CA (US)

(72) Inventors: Christopher James Gibson, Belmont, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 108 days.

(21) Appl. No.: 16/698,366

(22) Filed: Nov. 27, 2019

(65) Prior Publication Data

US 2021/0156704 A1    May 27, 2021

(51) Int. Cl.
*G01C 21/36* (2006.01)
*G06K 9/00* (2006.01)

(52) U.S. Cl.
CPC ....... *G01C 21/3602* (2013.01); *G01C 21/367* (2013.01); *G06K 9/00818* (2013.01); *G06K 9/00825* (2013.01)

(58) Field of Classification Search
CPC .............. G01C 21/3602; G01C 21/367; G06K 9/00818; G06K 9/00825
See application file for complete search history.

(56) References Cited

U.S. PATENT DOCUMENTS

| | | | | |
|---|---|---|---|---|
| 9,088,771 | B2 * | 7/2015 | Jung | H04N 13/111 |
| 2001/0036293 | A1 * | 11/2001 | Laumeyer | G06T 7/11 |
| | | | | 382/104 |
| 2014/0132738 | A1 * | 5/2014 | Ogura | G02B 7/02 |
| | | | | 348/47 |
| 2015/0210275 | A1 * | 7/2015 | Huberman | G05D 1/0088 |
| | | | | 382/104 |
| 2016/0321837 | A1 * | 11/2016 | Dillard | G06T 15/503 |
| 2017/0089710 | A1 * | 3/2017 | Slusar | G01C 21/3492 |
| 2017/0315227 | A1 * | 11/2017 | Ghazanfarpour | G01S 7/20 |
| 2019/0120947 | A1 * | 4/2019 | Wheeler | H04N 5/2329 |
| 2019/0325602 | A1 * | 10/2019 | Ondruska | G06K 9/00664 |
| 2020/0393265 | A1 * | 12/2020 | Piao | G06T 7/10 |

FOREIGN PATENT DOCUMENTS

| | | |
|---|---|---|
| EP | 3200154 A1 | 8/2017 |
| WO | WO2018217193 A1 | 11/2018 |

OTHER PUBLICATIONS

The PCT Search Report and Written Opinion dated Mar. 5, 2021 for PCT Application No. PCT/US20/61768, 10 pages.

* cited by examiner

*Primary Examiner* — Santiago Garcia
(74) *Attorney, Agent, or Firm* — Lee & Hayes, P.C.

(57) ABSTRACT

Techniques are disclosed for updating map data. The techniques may include detecting a traffic light in a first image, determining, based at least in part on the traffic light detected in the first image, a proposed three-dimensional position of the traffic light in a three-dimensional coordinate system associated with map data. The proposed three-dimensional position may then be projected into a second image to determine a two-dimensional position of the traffic light in the second image and the second image may be annotated, as an annotated image, with a proposed traffic light location indicator associated with the traffic light. The techniques further include causing a display to display the annotated image to a user, receiving user input associated with the annotated images, and updating, as updated map data, the map data to include a position of the traffic light in the map data based at least in part on the user input.

20 Claims, 9 Drawing Sheets

UPDATING MAP DATA

BACKGROUND

Data can be captured in an environment and represented as a map of the environment. Often, such maps can be used by vehicles navigating within the environment, although the maps can be used for a variety of purposes. In some cases, the environment may change such that the map does not accurately reflect the environment, which may render the map data unsuitable for use. Updating map data to reflect changes in the environment may be difficult or costly.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

This disclosure is directed to systems and techniques for updating map data, for example, that is used by autonomous vehicles navigating within an environment. For example, systems and techniques according to this disclosure may allow for the updating of map data of the environment based on image data acquired by a vehicle utilizing the current map data.

Image data acquired by the vehicle utilizing the current map data may be flagged, for example, by the onboard computer of the vehicle when (1) an object detected in the image data does not correspond to an object in the map data, (2) an object in the map data is not detected in the image data; or (3) an object in the image data appears to correspond to an object in the map data but has a different position (e.g. a traffic light that has been moved or repositioned on the traffic light assembly). The flagged image data may be provided to a map update system, which may be part of a central control system, which may operate to analyze the image data and generate proposed changes to the map data that may be provided to a system operator (e.g. a reviewing user).

In some examples, a perception component of the map update system may detect an object in the image data. The detected object may be tracked over multiple image frames (e.g. multiple frames of video or multiple still image frames). Based on the tracking, a proposed location for the object in the coordinate system of the map data (also referred to herein as candidate location or initial location) may be generated. The perception system may also classify the detected object (e.g. as a road sign, a traffic light, etc.). A map component of the map update system may be configured to determine whether or not the map data includes an object of the determined classification at the proposed location.

In the case that the detected object does not appear in the map data or corresponds to an object in the map data that has moved (e.g. a new object of a classification is detected and a previously mapped object of the same classification is missing), a projection component of the map update system may project a proposed location indicator into image frames including a view of the detected object. In some examples, the projection component may perform projection of proposed location indicators and corresponding identifiers into the plurality of the images at positions in the two-dimensional image space of each image corresponding to the three-dimensional coordinates of the proposed locations of the detected objects.

Similarly, in the case that the map data includes an object that does not appear in the image data, the projection component of the map update system may project a location indicator into the image frames to illustrate the previous location of the missing object.

The image frames including the location indicator(s) may be displayed to a reviewing user. The reviewing user may provide feedback regarding the location indicators. For example, the reviewing user may accept or reject proposed locations. The map component may then add objects to the map data for the accepted proposed locations. In addition, the reviewing user may request additional proposed locations for objects whose proposed location were rejected (e.g. based on additional image data). In some implementations, the central control system, of which the map update system may be a part, may instruct one or more autonomous vehicles to travel to the location of the objects of interest to capture the additional image data. In the case of a previous location indicator, the reviewing user may provide feedback confirming that the object in the map data is no longer present at the previous location.

The map update techniques described herein can improve a functioning of a computing device, such as an autonomous vehicle system, by providing updated map data that reflects changes in the environment for performing subsequent operations to control an autonomous vehicle with reduced difficultly and cost. For example, the updated map data can allow subsequent processes such as localization, perception (e.g., detecting, identifying, segmenting, classifying, tracking, etc.), route planning, trajectory generation, and the like to be performed more accurately while requiring less manual intervention and/or disruption. For example, in some instances, faster and/or more accurate map updates can be used in generating a trajectory of an autonomous vehicle more quickly, reducing disruptions and a shorter window in which manual override may be needed to handle changes in the environment and can improve safety for occupants of an autonomous vehicle (e.g. by reducing the window in which the map data is inaccurate or in which the autonomous vehicle may perform an inappropriate action based on inaccurate application of the outdated map data to the changed environment). These and other improvements to the functioning of the computer are discussed herein.

Example Architecture

Figure 1:
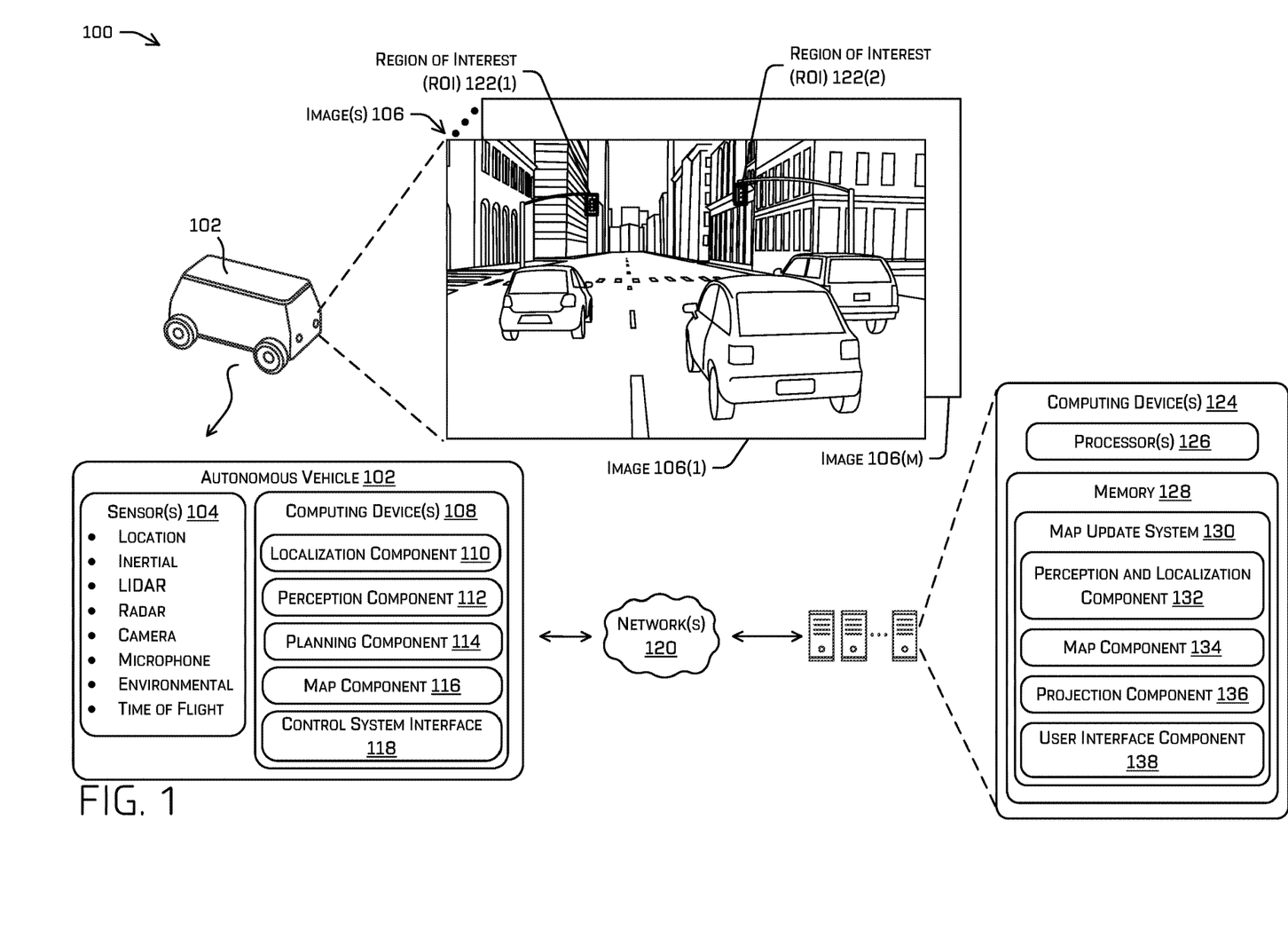
FIG. 1 illustrates an example autonomous vehicle system that detect objects in an environment and updates map data based thereon.

FIG. 1 illustrates an example autonomous vehicle system 100 that detect objects in an environment and updates map data based thereon. In some instances, an autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 102 may receive image(s) 106(1) to 106(M) (collectively "images 106"), where M is any integer greater than 1, from the sensor(s) 104. The discussion herein primarily discusses images, for ease, but it is contemplated that the techniques may be applied to any sensor data that has the capability to discretely represent an object (e.g., a point cloud including points that represent an object).

In some examples, the autonomous vehicle may include computing device(s) 108 that may include a localization component 110, a perception component 112, a planning component 114, a map component 116, and/or a control system interface 118.

In at least one example, the localization component 110 can include functionality to receive data from the sensor system(s) 104 to determine a position of the vehicle 102 (also referred to herein as localization data). For example, the localization component 110 can include and/or request/receive a map of an environment (e.g. from the map component 116) and can continuously determine a location of the autonomous vehicle within the map (e.g. localize a position of the autonomous vehicle 102 on a global map and/or a local map). In some instances, the localization component 110 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 110 can provide the localization data to various components of the vehicle 102 to determine an initial position of an autonomous vehicle for generating a candidate trajectory, as discussed herein.

The perception component 112 may include one or more ML models and/or other computer-executable instructions for detecting, identifying, segmenting, classifying, and/or tracking objects from sensor data collected from the environment of the autonomous vehicle 102. In some instances, the perception component 112 may receive sensor data from sensor(s) 104 of the autonomous vehicle 102 and localization data from the localization component, determine perception data from the sensor data, and transmit the perception data to a planning component 114 for use by the planning component 114 to determine one or more trajectories, and/or control motion of the autonomous vehicle 102 to traverse a path or route, though any such operation may be performed in various other components. In some instances, the perception data may comprise a region of interest (an "ROI") and/or a track associated with an object detected in an image. The planning component 114 may determine instructions for controlling operations of the autonomous vehicle 102 based at least in part on the ROI and/or the track.

For example, the perception component 112 may detect an object in the environment and classify the object (e.g., "traffic signal," "four-wheeled vehicle," "semi-truck," "pedestrian," "animal," "construction vehicle"). In the illustrated example, autonomous vehicle 102 may receive image(s) 106 comprising image 106(1), which includes a representation of a two traffic signals. The perception component 112 may generate ROIs 122(1) and 122(2), each corresponding to a respective traffic light represented in image 106(1). In the illustrated example, the ROIs 122 are represented as bounding boxes, although other techniques for identifying the ROIs are contemplated.

In some examples, the perception component 112 may also track an object, such as the traffic lights corresponding to ROIs 122. In some examples, a track may comprise an association between objects detected in two different images. The track may thereby be an indication that the perception component 112 is identifying two object detections as corresponding to a same object. In some examples, the track may additionally or alternatively comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured them image) and/or image-relative characteristics (e.g., a velocity associated with movement of a representation of the object across images in pixels per second, a heading that identifies an angle of movement of the representation of the object in the image). Of course, the track information for an object may comprise any data structure and/or format.

In some instances, the localization component 110 may determine a position of the autonomous vehicle 102 e.g. using any sensor data to localize the autonomous vehicle 102). The perception component 112 may determine data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception component 112 may be collectively referred to as "perception data." In some instances, the map data may be retrieved and provided by the map component 116. More particularly, based on a position of the autonomous vehicle 102, the map component 116 may load or otherwise retrieve from a memory or network local map data and global map data for use by the perception component 112 in detecting and classifying objects from the images. Once the perception component 112 has identified and/or segmented objects from the image and/or determined other perception data, the perception may provide the perception data, including the object detections and/or instance segmentations, to a planning component 114.

In some instances, the planning component 114 may use perception data, including the ROIs, track, and/or segmentations (discussed further below) to generate instructions for controlling operation of the autonomous vehicle 102. For example, the planning component 114 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second, two seconds, eight seconds, etc.) and based at least in part on an ROI, track, and/or segmentation, to control the vehicle to traverse the route; and select one of the potential trajectories as a trajectory of the autonomous vehicle 102 that may be used to generate a drive control signal that may be transmitted to drive components of the autonomous vehicle 102.

In addition, the perception component 112 may determine if (1) an object detected in the image data does not correspond to an object in the map data, (2) an object in the map data is not detected in the image data; or (3) an object in the image data appears to correspond to an object in the map data but has a different position (e.g. a traffic light that has been moved or repositioned on the traffic light assembly). If so, the perception component 112 may flag the detected objects in a plurality of image frames and cause the control system interface 118 to send the images of the flagged objects to the map update system 130 over one or more network(s) 120.

As described above and as discussed throughout this disclosure, the vehicle 102 can send image data to one or more computing device(s) 124, via one or more network(s) 120. In some examples, the vehicle 102 can send raw sensor data (e.g. images or other raw sensor data without metadata or identification of detected objects) to the computing device(s) 124. In other examples, the computing device(s) 124 can send processed sensor data and/or representations of sensor data (e.g. processed images or other processed sensor data, for example, with metadata or other additional data identifying of detected object(s) whose presence caused the images to be flagged) to the computing device(s) 124. In some cases, the vehicle 102 can send sensor data (raw or processed) to the computing device(s) 124 as one or more log files. For ease of understanding, the following discussion may refer to sensor data as image data. However, implementations are not so limited and other sensor data such as those described above may be utilized in addition or alternatively to image data.

In at least some examples, the vehicle 102 may detect such traffic objects and/or characteristic determine discrepancies between such detected information and information included in map data. The detection of such discrepancies may be used as a trigger to send such data to a computing device(s) 124 for confirmation and/or validation. In at least some such examples, the vehicle 102 may perform one or more maneuvers based on the discrepancy (such as coming to a safe stop) and/or weighting the contribution of such detections up and/or down in order to continue planning a trajectory through the environment.

The computing device(s) 124 may receive the image data and may generate and/or update map data based on the image data. In at least one example, the computing device(s) 124 can include one or more processors 126 and memory 128 communicatively coupled with the one or more processors 126. In the illustrated example, the memory 128 of the computing device(s) 124 stores a map update system 130 that may include or utilize the functionality of a perception and localization component 132 (hereinafter perception component 132), a map component 134, a projection component 136 and a user interface component 138. In at least one example, the computing device(s) 124 may be or be a portion of an autonomous vehicle control system managing operations of a plurality of autonomous vehicles 102.

As discussed above, the map update system 130 may receive image data via the network(s) 120. The map update system 130 may be configured to update maps based on the received image data.

In some examples, the perception component 132 of the map update system 130 may perform perception processing on the image data to detect an object in the image data. The detected object may be tracked over multiple image frames (e.g. multiple frames of video or multiple still image frames). The information may further include or the map update system 130 may otherwise determine localization information (e.g. the location of the image capture sensor) in the coordinate system of the map data. More particularly, the localization information may localize the vehicle (or image capture sensor) in the environment and may be generated using a variety of techniques (e.g., SLAM) and using potentially many types of sensor data (lidar, gps, image, IMU). The localization information may also include the pose (position, orientation, etc.) of the camera.

Based on the tracking and the localization information, a proposed location for the object in the coordinate system of the map data may be generated. For example, based on the vehicle position and the camera pose, a UTM (universal transverse Mercator) location (or other location such as latitude and longitude) and a height associated with each pixel in image data may be determined. Over a series of frames, the perception component 132 may triangulate a position of the tracked object in the environment and determine the UTM and/or height information for each frame with adequate certainty. In other words, in some embodiments, the perception component 132 may project a ray from the camera origin to each pixel in the image and triangulate the position over time. In some embodiments, this process may be performed without depth data. The UTM and/or height information associated with the center of the tracked object determined over the series of frames may be utilized as the proposed location.

The perception component 132 may also classify the detected object (e.g. as a road sign, a traffic light, etc.). In some examples, the perception component 132 may perform functions similar and/or in a similar manner to that discussed above with regard to the perception component 112.

The map component 134 of the map update system 130 may retrieve map data provided for the environment, area or geographic location at which the image data was captured. In an example, the environment, area or geographic location at which the image data was captured may be provided as metadata to the received image data or otherwise provided by the system capturing the image data.

Based on the position and/or classification of the object detected by the perception component 132 and the map data provided for the environment, area or geographic location at which the image data was captured, the perception component 132 of the map update system 130 may determine whether or not the map data includes an object of the determined classification at the proposed location.

In the case that the detected object does not appear in the map data or corresponds to an object in the map data that has moved, the projection component 136 of the map update system may project a proposed location indicator into the image frames including the view of the detected object. In some examples, the projection component 136 may perform projection by overlaying proposed location indicators and corresponding identifiers into the plurality of the images at positions in the two dimensional image space of each image corresponding to the three dimensional coordinates of the proposed locations of the detected objects. For example, the UTM and/or height information associated with the center of the tracked object utilized as the proposed location and projected from the 3D coordinates of the UTM and height information to a 2D location in the image space.

In this or any other example discussed herein, the projection component 136 may project the indicator into any images or video captured by any vehicle (as long as the vehicle is correctly localized in the environment). In other words, the images into which the proposed location indicators are projected may be the same images used for detection and position determination, entirely different images, or some mix thereof. Further, the images into which the proposed location indicators are projected may be captured at a different time from the images used for detection and position determination.

Similarly, in the case that the map data includes an object that does not appear in the image data, the projection component 136 of the map update system 130 may project a previous location indicator into the image frames to illustrate the previous location of the missing object.

The user interface component 138 may display the image frames including the location indicator(s) to a reviewing user. The reviewing user may provide feedback regarding the location indicators to the user interface component 138. For example, the reviewing user provide feedback accepting or rejecting proposed locations. In the case of a previous location indicator, the reviewing user may provide feedback confirming or denying that the object in the map data is no longer present at the previous location.

Based on the feedback, the map component 134 may add objects to the map data for the accepted proposed locations. In a case in which a user confirms that an object is no longer present at the previous location, the map component 134 may be configured to remove the object from the map data. Where a proposed location is rejected, the reviewing user may request additional proposed locations for objects whose proposed location were rejected (e.g. based on additional image data). In some implementations, a control system, of which the map update system 130 may be a part, may instruct one or more autonomous vehicles to travel to the location of the objects of interest to capture the additional image data.

While the example system to FIG. 1 operates based on image data captured by autonomous vehicles, implementations are not so limited and the source of the image data may vary. Other variations or features may be incorporated into some embodiments. For example, some embodiments may incorporate a filtering functionality configured to determine a difference between the captured data regarding the new, missing or changed object(s) and the existing map data. The filtering functionality may determine whether the difference is above a threshold and discard or otherwise not perform the projection and review processes when the difference is below the threshold. This may reduce the number of false positives caused by issues such as miscalibrated sensors or similar factors.

Moreover, while the examples discussed herein relate to projecting a position indictor into image data, embodiments are not so limited. For example, in addition or alternatively, the projection component 136 may project other information into the image. Some other non-limiting types of information which may projected into the image may include extents, dimensions and orientations, states of the detected objects, etc. For example, the orientation information may include yaw, pitch and roll of a traffic light. In a specific example, the yaw of the traffic light may be projected into the image to aid the reviewing user in determining the incoming road or lane associated with the traffic light.

Figure 2A:
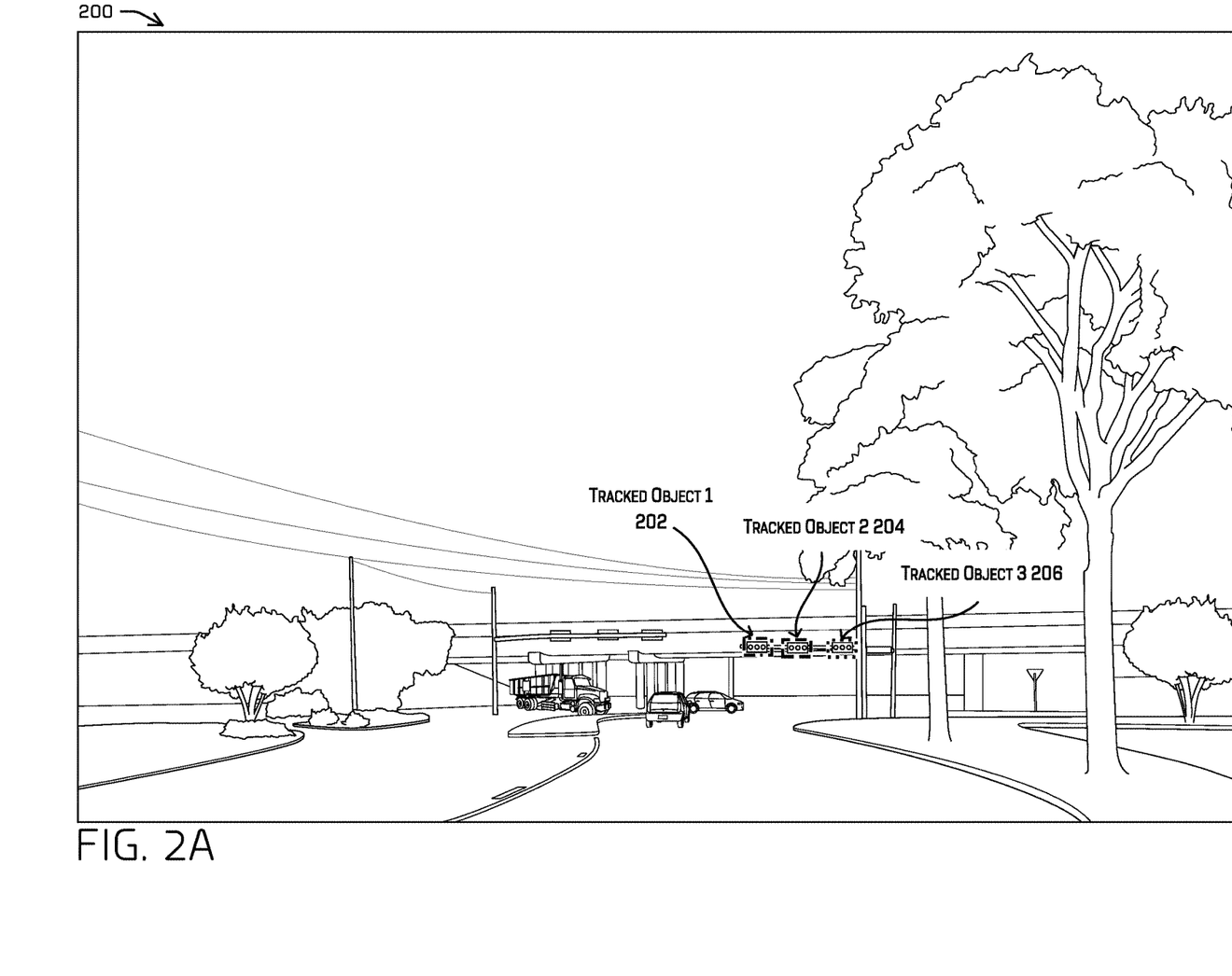
FIGS. 2A-2C illustrate a series of images of an intersection captured at different times and an example of detecting and tracking of objects in the series of images by a perception component.
Figure 2B:
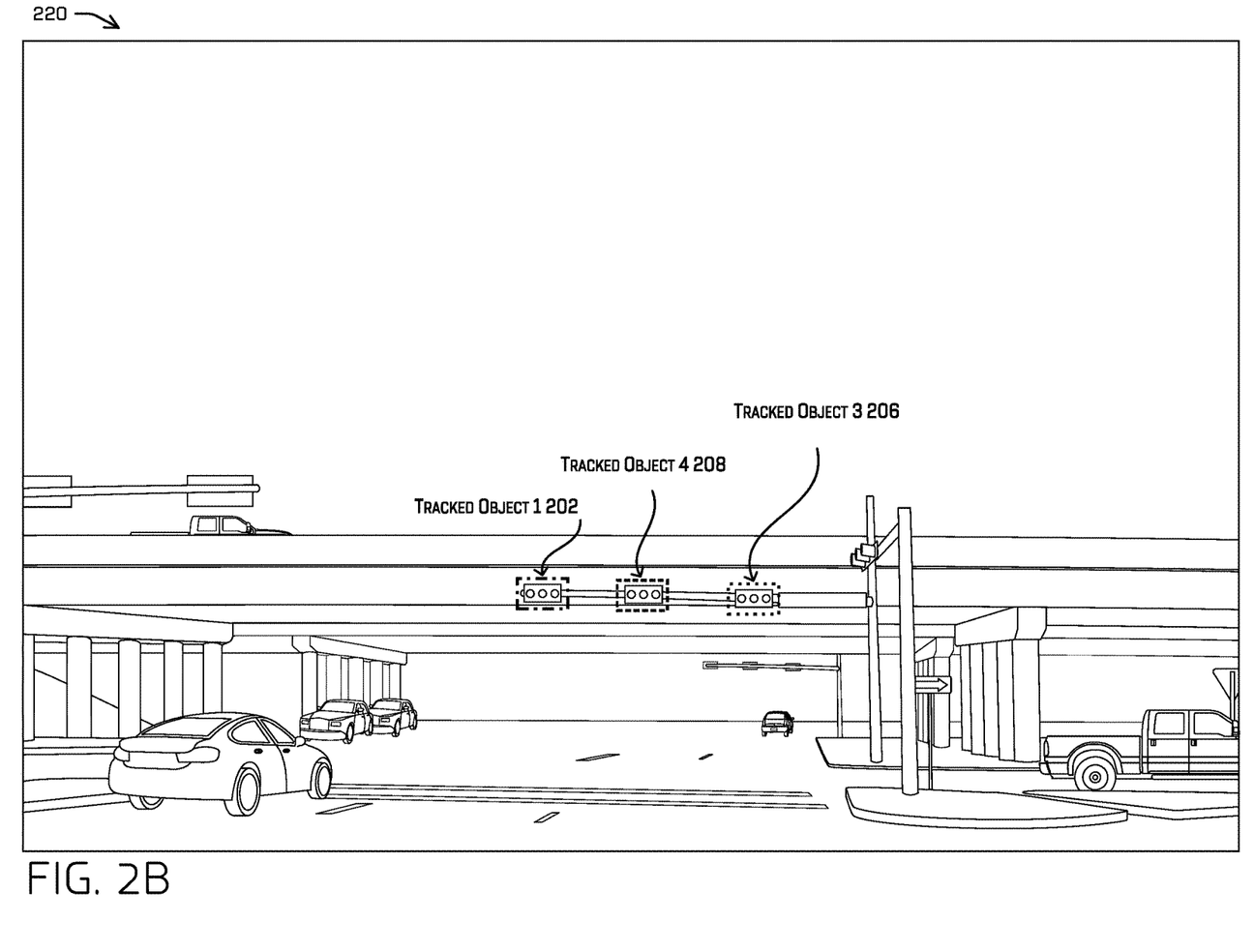
Figure 2C:
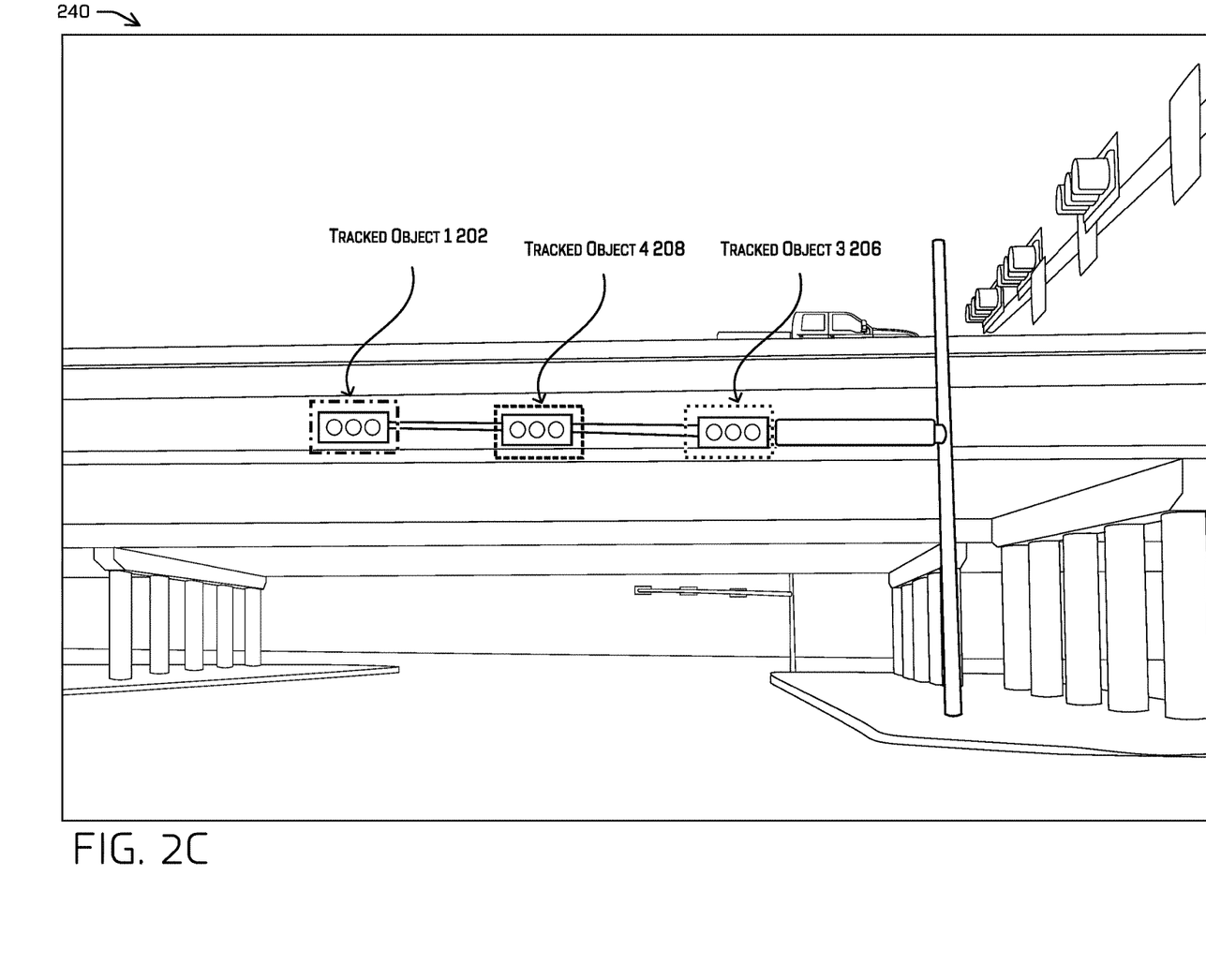

FIGS. 2A-2C illustrate a series of images 200, 220 and 240 of an intersection captured at different times and an example detection and tracking on the series of images by the perception component 132. More particularly, FIG. 2A illustrates an image 200 (also referred to as an image frame or frame) of the intersection captured at a first time, FIG. 2B illustrates an image 220 of the intersection captured at a second time, and FIG. 2C illustrates an image 240 of the intersection captured at a third time.

For ease of illustration and explanation, the detection and tracking of objects in the figures is limited to traffic signals. Embodiments are not limited to traffic signals and any other object included in the map data may detected and tracked in a similar process. For example, other objects that may be included in the map data may include other signage and road features. More particularly, such objects may include signage and signals such as crosswalk signals (walking and/or hand indicators), speed limits signage, stop signs, yield signs, street name signage, one-way street signs, turn policy signs (e.g. no right on red, no U-turn, do not enter and wrong way, no left turn, etc.), and so on. Road features which may be included in the map data may include painted markings such as crosswalks, stop lines, lane markings, and so on. Similarly, such detections may include, more generally, characteristics of objects in the environment used for traffic control. As non-limiting examples, such characteristics may include, but are not limited to a size, extents, orientation (such as yaw angle), or state (red, yellow, green, etc.) of a traffic light, or the like.

Further, though three image frames are shown in the examples illustrated in FIG. 2A-2C, more or fewer image frames may be utilized and the discussion below presumes additional frames are processed between frames 200 and 220 and 220 and 240 which are not illustrated to avoid excess prolix. However, implementations may utilize any number of frames.

In FIG. 2A, the perception component 132 may perform detection and tracking processing on the image 200. The perception component 132 may detect three objects, tracked object 1 202, tracked object 2 204, and tracked object 3 206, corresponding to the traffic signals within corresponding regions of interest (ROIs). Each detected object may be associated with a classification and/or an object track, as discussed herein.

In FIG. 2B, the perception component 132 may perform detection and tracking processing on the image 220. Similar to FIG. 2A, the perception component 132 may detect and track the leftmost and rightmost traffic signals as tracked object 1 202 and tracked object 3 206. However, due to any of a variety of reasons, perception component 132 may detect but not assign the middle traffic light to the track of tracked object 2 204. For example, the middle traffic light may not have been detected in one or more image frames between image frames 200 and 220 resulting in a loss of tracking or the position detected in FIG. 2B may be sufficiently different from the position detected in FIG. 2A that the perception component 132 begins a new track. More particularly, the middle traffic signal may be detected as a new object and assigned a new track as tracked object 4 208.

In FIG. 2C, the perception component 132 may perform detection and tracking processing on the image 240. In particular, the perception component 132 may detect and maintain the track of each traffic signals from FIG. 2B as tracked object 1 202, tracked object 4 208 and tracked object 3 206, respectively.

Based on the detection and tracking and the location of the camera at the time each of images 200, 220 and 240 were captured, the perception component may estimate positions for each tracked object 202-208 (e.g. based on the location of the camera when it captured each of images 200, 220 and 240 and the relative position of the tracked objects 202-208 to the camera). The location of the camera in the coordinate system of the map data when it captured each image may be included as metadata to the images or the map update system 130 may determine the location information. The perception component 132 may also classify the detected object (e.g. as a road sign, a traffic light, etc.). Additional discussion of techniques and systems for determining object positions and classifications is provided in U.S. patent application Ser. No. 15/814,870, entitled "Pose Determination From Contact Points," the entirety of which is herein incorporated by reference.

The map component 134 of the map update system 130 may retrieve map data provided for the environment, area or geographic location at which the image data was captured. In an example, the environment, area or geographic location at which the image data was captured may be provided as metadata to the received image data or otherwise provided by the system capturing the image data.

Based on the position and/or classification of the tracked objects 202-208 detected by the perception component 132 and the map data provided by the map component 134, the perception component 132 may determine whether or not the map data includes corresponding objects of the determined classification at the proposed locations.

In the case that the detected objects do not appear in the map data, the projection component 136 of the map update system may project a proposed location indicator into the image frames including the view of the tracked object. As discussed above, the projection component 136 may perform projection by overlaying proposed location indicators and corresponding identifiers into the plurality of the images at positions in the two dimensional image space of each image corresponding to the three dimensional coordinates of the proposed locations of the detected objects. More generally, such detected traffic characteristics may be associated with a graphic element to be presented on display. For instance, and as non-limiting examples, a yaw indication of a traffic light may be presented as an arrow indicator, extents may be presented as a bounding box, a state of a traffic light may be associated with a color (e.g., red, green, yellow), and the like. Additional discussion of techniques and systems for projecting an indicator or other information to a position in an image space corresponding to a position in a three-dimensional space is provided in U.S. patent application Ser. No. 15/814,870, entitled "Pose Determination From Contact Points," the entirety of which is herein incorporated by reference.

Figure 3A:
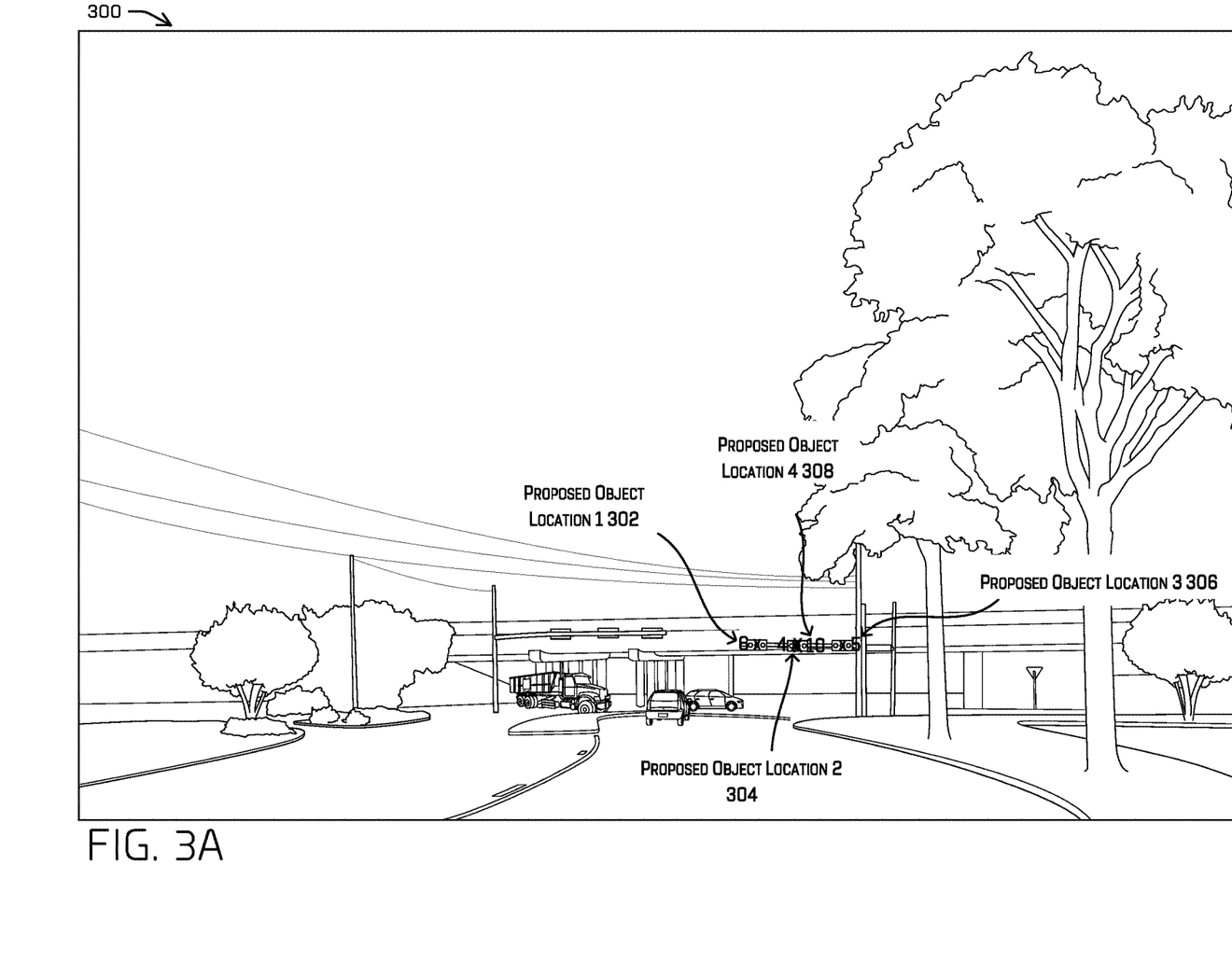
FIGS. 3A-3C depict the example images of FIG. 2A-2C with proposed object location indicators for objects detected and tracked by the perception component.
Figure 3B:
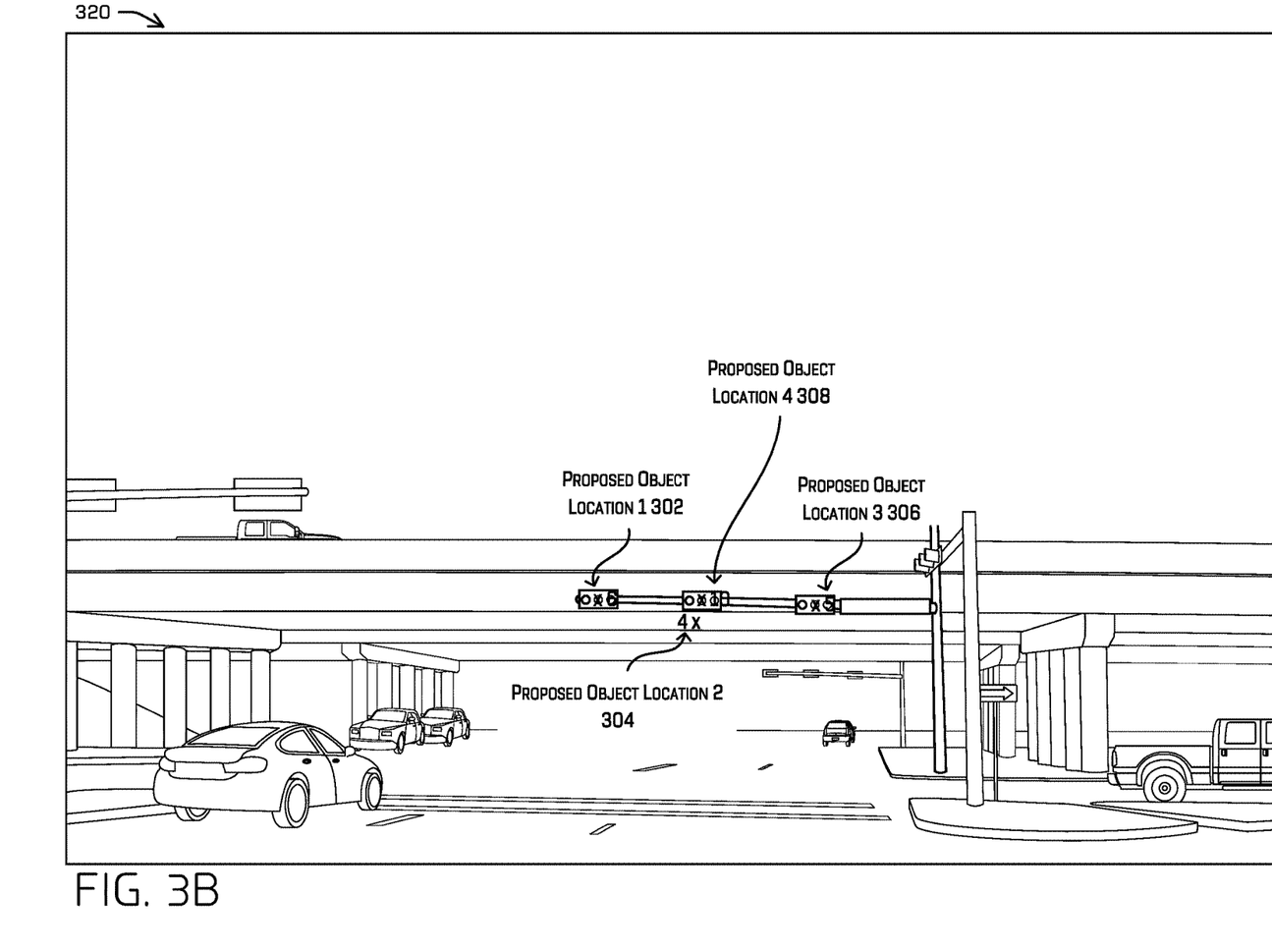
Figure 3C:
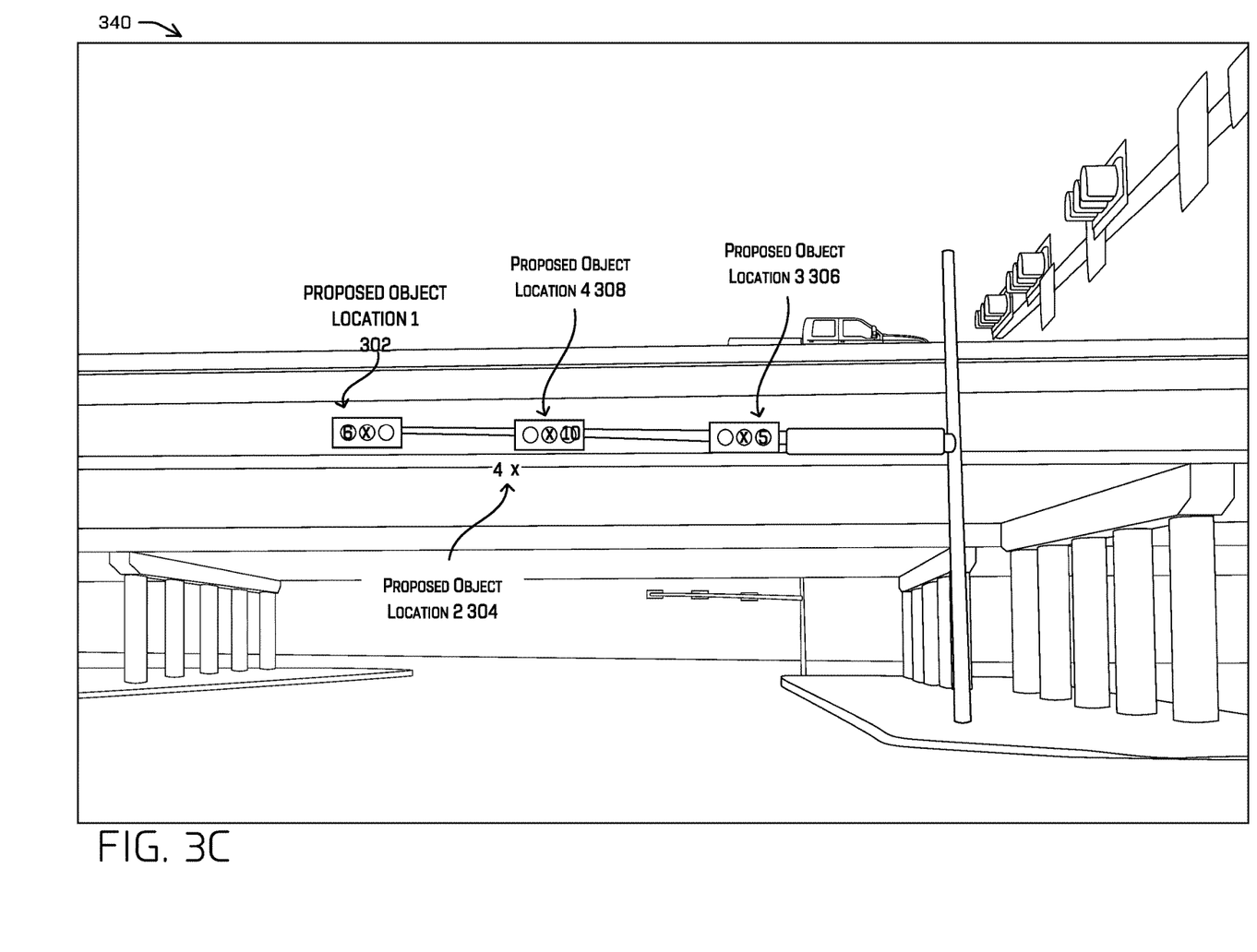

FIGS. 3A-3C illustrate the series of image frames from FIGS. 2A-2C with example proposed location indicators (with corresponding identifiers) for the tracked objects detected and tracked by the perception component 132. Such image frames may be displayed to a reviewing user by the user interface component 138 and the reviewing user may provide feedback based thereon (e.g. accepting, rejecting, and/or modifying the indicated proposed locations). Further, though three image frames are shown in the examples illustrated in FIG. 3A-3C, more or less image frames may be utilized and the discussion below presumes additional frames may be processed and displayed to the user between frames 300 and 320 and 320 and 340 which are not illustrated to avoid excess prolix. However, implementations may utilize any number of frames greater than one.

More particularly, in the view of image 300, a proposed object location 1 302 corresponding to the tracked object 1 202 is illustrated as having an identifier of "6" and a proposed location indicated by the "x" over the center of the leftmost traffic signal. A proposed object location 2 304 corresponding to the tracked object 2 204 is illustrated as having an identifier of "4" and a proposed location indicated by the "x" over the center of the middle traffic signal. A proposed object location 3 306 corresponding to the tracked object 3 206 is illustrated as having an identifier of "5" and a proposed location indicated by the "x" over the center of the rightmost traffic signal. A proposed object location 4 308 corresponding to the tracked object 4 208 is illustrated as having an identifier of "10" and a proposed location indicated by a second "x" over the center of the middle traffic signal.

FIGS. 3B and 3C illustrate images 320 and 340 which correspond to image 220 and 240. Each of images 320 and 340 also includes proposed object locations 302-308 as projected into the view of the respective image. As illustrated, the proposed object locations 1 302, 3 306 and 4 308 maintain their position relative to the traffic signals in the image view from image 300 to 340. Because the indicators corresponding to proposed object locations 302, 306 and 308 maintain the position relative to the corresponding traffic signals, a reviewing user may determine that the proposed positions are correct. On the other hand, the indicator corresponding to proposed object location 2 304 drifts away from the middle traffic signal from image 300 to image 320 and from image 320 to image 340. This is indicative of, and a reviewing user may determine that, the proposed position for proposed object location 2 304 is incorrect. Indeed, the proposed position of the proposed object location 2 304 is behind the middle traffic signal in the coordinate space of the map data (e.g. a location between the traffic signal and the overpass behind the traffic signal), resulting in the drifting of the proposed location indicator relative to the middle traffic signal. Accordingly, a reviewing user may provide feedback rejecting proposed object location 2 304.

Though not illustrated, in the case that the map data includes an object that does not appear in the image data, the projection component 136 of the map update system 130 may project a previous location indicator into the image frames to illustrate the previous location of the missing object. In reviewing the image frames, the user may utilize the previous location indicator to determine the object is still located at the indicated position (e.g. if the indicator maintains its position relative to an undetected object in the image frame, the detection may have failed and the object may still be present).

As mentioned above, the user interface component 138 may display the image frames 300, 320 and 340 including the proposed object locations 302-308 to a reviewing user. The reviewing user may provide feedback as discussed above regarding the location indicators to the user interface component 138. For example, the reviewing user may provide feedback accepting or rejecting proposed locations.

In the case of a previous location indicator, the reviewing user may provide feedback confirming or denying that the object in the map data is no longer present at the previous location.

Based on the feedback, the map component 134 may add objects to the map data for the accepted proposed object locations. Where a user confirms an object is no longer present at the previous location, the map component 134 may be configured to remove the object from the map data. Where a proposed object location is rejected, the reviewing user may request additional proposed locations for objects whose proposed location were rejected (e.g. based on additional image data).

Example Process

Figure 4:
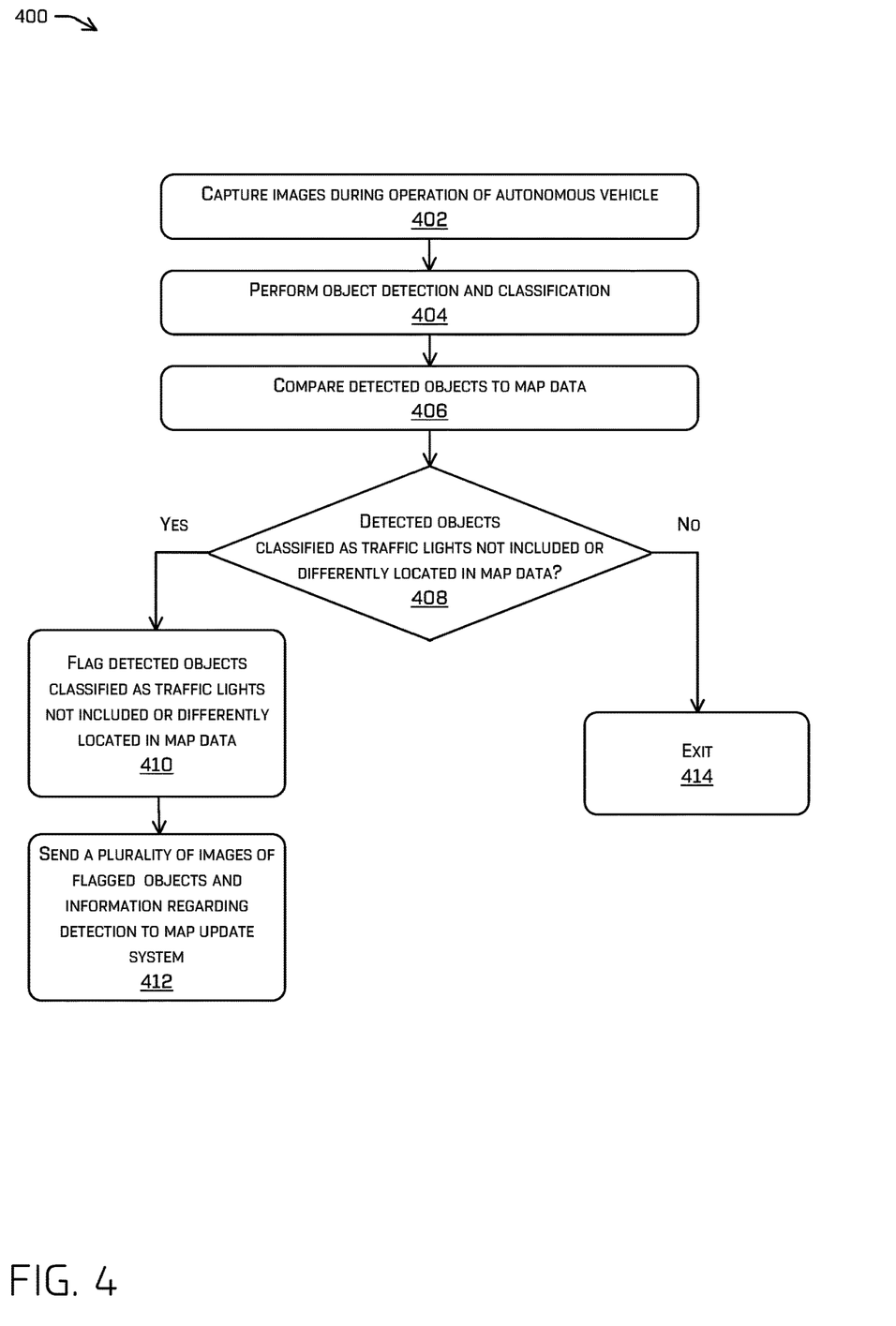
FIG. 4 illustrates a flow diagram of an example process for detecting, tracking and flagging objects in an environment for processing by a map update system.

FIG. 4 illustrates an example process 400 for detecting, tracking and flagging objects in an environment which do not appear in map data for processing by a map update system. In some examples, process 400 may be accomplished by component(s) of system 100. In some examples, the example process 400 may be performed by an onboard computer system of an autonomous vehicle 102 or may be performed in whole or in part by aspects of the computing device(s) 124. While FIG. 4 is discussed in the specific context of traffic lights and traffic signals, some embodiments may perform similar operations with regard to any type of objects in the environment which is represented in the map data.

At operation 402, the sensor(s) of the autonomous vehicle (or any vehicle or system capturing sensor data) may capture images during operation of the autonomous vehicle. At operation 404, the computing devices onboard the autonomous vehicle may perform object detection and classification on the captured images. The detected and classified objects in the images may then be compared to objects in the map data at 406.

At operation 408, the onboard computing devices may determine whether any detected objects are classified as traffic lights and not included or differently located in the map data. If so, the process may continue to 410. Otherwise, the process may continue to operation 414 and exit.

At operation 410, the onboard computing devices may flag the detected objects classified as traffic lights and not included or differently located in the map data in metadata or other data. The onboard computing devices may then send a plurality of images of the flagged objects and the metadata or other data regarding the detected and flagged objects to the map update system at 412.

Note that, although the example process 400 is depicted as sequential operations, it is understood that the operations discussed herein may be performed in a different order, simultaneously, and/or by one or more devices. Further, though process 400 is described as occurring on an autonomous vehicle, implementations are not so limited. For example, in some embodiments, the detection and flagging of objects for map update may be performed by a manually driven vehicle with an onboard sensor and computing device system that performs the operations discussed above. Moreover, in some embodiments, the sensors and computing devices performing the operations discussed above may not be aboard or in any way associated with a vehicle. Further, in other embodiments, all images may be uploaded to the map update system without processing and flagging.

Figure 5:
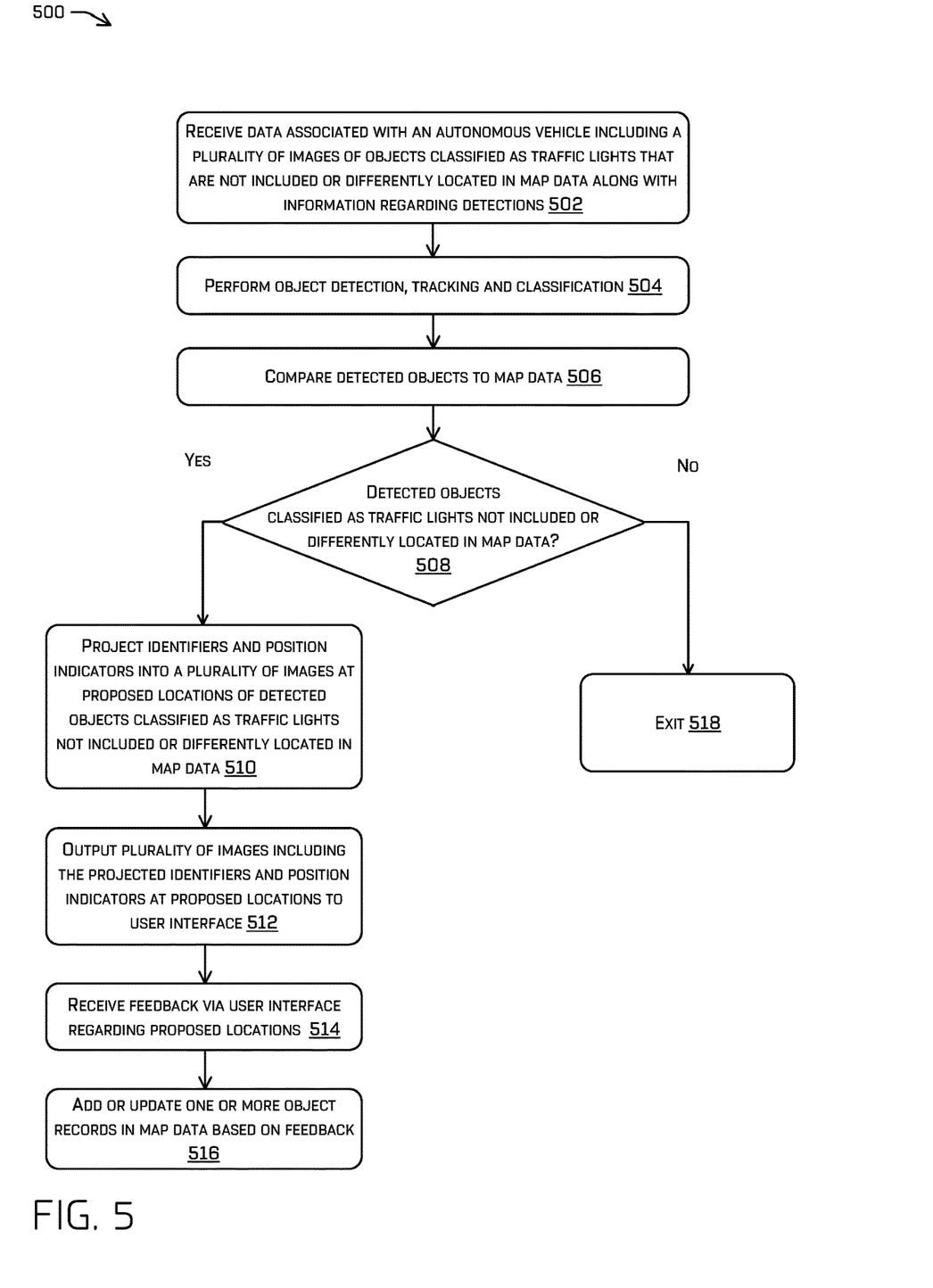
FIG. 5 illustrates a flow diagram of an example process for updating map data based on detecting and tracking objects in an environment.

FIG. 5 illustrates an example process 500 for updating map data based on detecting and tracking objects in an environment (e.g. traffic signals). In some examples, example process 500 may be accomplished by component(s) of system 100. In some examples, the process 500 may be performed by a map update system 130 of an autonomous vehicle control system. While FIG. 5 is discussed in the specific context of traffic lights and traffic signals, some embodiments may perform similar operations with regard to any type of objects in the environment which is represented in the map data.

At operation 502, the map update system may receive data associated with an autonomous vehicle including a plurality of images of objects classified as traffic lights that are not included or differently located in map data along with information regarding detections. However, as mentioned above, implementations are not limited to inputs received from an autonomous vehicle. In other embodiments, the input may be raw sensor data or another source of flagged or processed image data.

At 504, the map update system may perform object detection, tracking and classification. The detected objects in the images may then be compared to objects in the map data at 506. At 508, the map update system may determine whether any detected objects are classified as traffic lights and not included or differently located in the map data. If so, the process may continue to 510. Otherwise, the process may continue to 518 and exit.

At 510, the map update system may project identifiers and position indicators into a plurality of the images at positions in the two dimensional image space corresponding to the three dimensional coordinates of the proposed locations of the detected objects classified as traffic lights and not included or differently located in map data. The map update system may then output or display the plurality of images including the projected identifiers and position indicators to a user interface for review by a reviewing user at 512.

At 514, the map update system may receive feedback via the user interface regarding proposed locations. For example, the received feedback may indicate acceptance or rejection of the proposed locations. For example, if the position indicator for a detected object stays "attached" or over the detected object over multiple frames and/or when projected into images taken from different distances or angles, the reviewing user may determine the proposed location is correct and provide feedback accepting the proposal.

At 516, in response to the feedback, the map update system may add or update one or more object records in map data based on the proposed object locations.

Note that, although the example process 500 is depicted as sequential operations, it is understood that the operations discussed herein may be performed in a different order, simultaneously, and/or by one or more devices. Further, though process 500 is described as receiving image data from an autonomous vehicle or as being part of an autonomous vehicle control system or as updating map data used by autonomous vehicles, implementations are not so limited. For example, in some embodiments, the detection of objects and updating of map data based thereon may utilize images captured using a manually driven vehicle with an onboard sensor and computing device system that performs the operations discussed above. Moreover, in some embodiments, the sensors and computing devices used to capture the image data may not be aboard or in any way associated with a vehicle.

Example Clauses

A. A method comprising: detecting a traffic light in a first image; determining, based at least in part on the traffic light detected in the first image, a proposed three-dimensional position of the traffic light in a three-dimensional coordinate system associated with map data; projecting the proposed three-dimensional position into a second image to determine a two-dimensional position of the traffic light in the second image; annotating, as an annotated image, the second image with a proposed traffic light location indicator associated with the traffic light; causing a display to display the annotated image to a user; receiving user input associated with the annotated image; and updating, as updated map data, the map data to include a position of the traffic light in the map data based at least in part on the user input.

B. The method of example A, wherein the first image is associated with an image sensor of an autonomous vehicle, the method further comprising: determining the proposed three-dimensional position of the traffic light based at least in part on an orientation of the image sensor relative to the map data; and transmitting the updated map data to the autonomous vehicle.

C. The method of example A, further comprising: detecting the traffic light in a third image; determining a second proposed three-dimensional position of the traffic light in the three-dimensional coordinate system; projecting the second proposed three-dimensional position into the second image to determine a second two-dimensional position of the traffic light in the second image; and annotating, as the annotated image, the second image to further comprise a second proposed traffic light location indicator associated with the traffic light, the position of the second proposed traffic light location indicator in the second image based at least in part on the second two-dimensional position of the traffic light D. The method of example C, wherein: receiving the user input comprises: receiving first user input rejecting the proposed three-dimensional position; and receiving second user input accepting the second proposed three-dimensional position; and updating the map data comprises: adding a map object to the map data corresponding to the traffic light based on the second proposed three-dimensional position.

E. The method of example C, wherein the first image is captured by a different device than the third image.

F. The method of example A, wherein annotating the second image comprises overlaying the proposed traffic light location indicator into the second image in a two-dimensional image space of the second image corresponding to the proposed three-dimensional position.

G. A system comprising: one or more processors; and a memory storing processor-executable instructions that, when executed by the one or more processors, cause the system to perform operations comprising: detecting a traffic object in first sensor data, the traffic object associated with a traffic object characteristic; determining a proposed characteristic of the traffic object in a coordinate system associated with map data; determining a representation of the proposed characteristic to be displayed in second sensor data; associating, based on the representation, a graphic element with the second sensor data; causing a display to display the graphic element to a user; receiving user input; and updating the map data based at least in part on the user input.

H. The system of example G, the traffic object characteristic comprises one or more of: a traffic light, a traffic light orientation, a traffic light state, a traffic sign, a lane indicator, or a cross walk.

I. The system of example G, wherein the user input comprises a confirmation, and wherein updating the map data comprises: determining that the map data does not comprise a traffic indicator associated with the traffic object; and associating the traffic object with the map based at least in part on the proposed characteristic.

J. The system of example G, the operations further comprising: detecting the traffic object in third sensor data; determining a second proposed characteristic of the traffic object; determining a second representation of the second proposed characteristic to be displayed in the second sensor data; associating, based on the second representation, a second graphic element with the second sensor data; and causing the display to display the second graphic element to the user.

K. The system of example J, wherein: receiving the user input comprises: receiving first user input rejecting the proposed characteristic; and receiving second user input accepting the second proposed characteristic; and updating the map data comprises: one or more of adding or updating the map data to include the traffic object based at least in part on the second proposed characteristic.

L. The system of example G, wherein the first sensor data comprises a first image acquired by a first device and the second sensor data comprises an image acquired by a second device.

M. The system of example L, wherein: the first sensor data comprises a first image captured by a first image sensor; the second sensor data comprises a second image captured by a second image sensor; the traffic object comprises a traffic light; the proposed characteristic comprises a proposed position of the traffic light relative to the map data; and associating the graphical element with the second sensor data comprises projecting the proposed position into the second image based at least in part on an orientation of an image sensor relative to the map data and a second orientation of the second image sensor relative to the map data.

N. The system of example G, wherein: updating map data comprises determining updated map data; the first sensor data is captured by a device associated with an autonomous vehicle; and the operations further comprise transmitting the updated map data to the autonomous vehicle, the autonomous vehicle is configured to traverse an environment based at least in part on the updated map data.

O. One or more non-transitory computer-readable media storing processor-executable instructions that, when executed by one or more processors, cause the one or more processors to perform operations comprising: detecting a traffic object in first sensor data, the traffic object associated with a traffic object characteristic; determining a proposed characteristic of the traffic object in a coordinate system associated with map data; determining a representation of the proposed characteristic to be displayed in second sensor data; associating, based on the representation, a graphic element with the second sensor data; causing a display to display the graphic element to a user; receiving user input; and updating the map data, as updated map data, based at least in part on the user input.

P. The one or more non-transitory computer-readable media of example O, wherein the object is a traffic object, wherein the user input comprises a confirmation, and wherein updating the map data comprises: determining that the map data does not comprise a traffic indicator associated with the traffic object; and associating the traffic object with the map based at least in part on the proposed characteristic.

Q. The one or more non-transitory computer-readable media of example O, the operations further comprising: detecting the object in third sensor data; determining a second proposed characteristic of the object; determining a second representation of the second proposed characteristic to be displayed in the second image; associating, based on the second representation, a second graphic element with the second image; and causing the display to display the second graphic element to the user.

R. The one or more non-transitory computer-readable media of example Q, wherein: receiving the user input comprises: receiving first user input rejecting the proposed characteristic; and receiving second user input accepting the second proposed characteristic; and updating the map data includes: one or more of adding or updating the map data to comprise the object based at least in part on the second proposed characteristic.

S. The one or more non-transitory computer-readable media of example O, wherein the first sensor data comprises a first image captured by a first image sensor of a first device and the second sensor data comprises a second image captured by a second image sensor of a second device; the object comprises a traffic light; the proposed characteristic comprises a proposed position of the traffic light relative to the map data; and associating the graphical element with the second sensor data comprises projecting the proposed position into the second image based at least in part on an orientation of the second image sensor relative to the map data and a second orientation of the second image sensor relative to the map data.

T. The one or more non-transitory computer-readable media of example 15, wherein the first sensor data is captured by a device associated with an autonomous vehicle, and wherein the operations further comprise transmitting the updated map data to the autonomous vehicle, the autonomous vehicle configured to traverse the environment based at least in part on the updated map data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   detecting a traffic light in a first image;
   determining, based at least in part on the traffic light detected in the first image, a proposed three-dimensional position of the traffic light in a three-dimensional coordinate system associated with map data;
   projecting the proposed three-dimensional position into a second image to determine a two-dimensional position of the traffic light in the second image;
   annotating, as an annotated image, the second image with a proposed traffic light location indicator associated with the traffic light;
   causing a display to display the annotated image to a user;
   receiving user input associated with the annotated image; and
   updating, as updated map data, the map data to include a position of the traffic light in the map data based at least in part on the user input.

2. The method of claim 1, wherein the first image is associated with an image sensor of an autonomous vehicle, the method further comprising:
   determining the proposed three-dimensional position of the traffic light based at least in part on an orientation of the image sensor relative to the map data; and
   transmitting the updated map data to the autonomous vehicle.

3. The method of claim 1, further comprising:
   detecting the traffic light in a third image;
   determining a second proposed three-dimensional position of the traffic light in the three-dimensional coordinate system;
   projecting the second proposed three-dimensional position into the second image to determine a second two-dimensional position of the traffic light in the second image; and
   annotating, as the annotated image, the second image to further comprise a second proposed traffic light location indicator associated with the traffic light, the position of the second proposed traffic light location indicator in the second image based at least in part on the second two-dimensional position of the traffic light.

4. The method of claim 3, wherein:
receiving the user input comprises:
  receiving first user input rejecting the proposed three-dimensional position; and
  receiving second user input accepting the second proposed three-dimensional position; and
updating the map data comprises:
  adding a map object to the map data corresponding to the traffic light based on the second proposed three-dimensional position.

5. The method of claim 3, wherein the first image is captured by a different device than the third image.

6. The method of claim 1, wherein annotating the second image comprises overlaying the proposed traffic light location indicator into the second image in a two-dimensional image space of the second image corresponding to the proposed three-dimensional position.

7. A system comprising:
one or more processors; and
a memory storing processor-executable instructions that, when executed by the one or more processors, cause the system to perform operations comprising:
  detecting a traffic object in first sensor data, the traffic object associated with a traffic object characteristic;
  determining a proposed characteristic of the traffic object in a three-dimensional coordinate system associated with map data;
  determining a representation of the proposed characteristic of the traffic object to be displayed in second sensor data by projecting the proposed characteristic to a two-dimensional position in the second sensor data;
  annotating, as annotated second sensor data and based on the two-dimensional position in the second sensor data, the second sensor data with a graphic element;
  causing a display to display the annotated second sensor data to a user; and
  receiving user input; and
  updating the map data based at least in part on the user input.

8. The system of claim 7, the traffic object characteristic comprises one or more of:
a traffic light,
a traffic light orientation,
a traffic light state,
a traffic sign,
a lane indicator, or
a cross walk.

9. The system of claim 7, wherein the user input comprises a confirmation, and
wherein updating the map data comprises:
  determining that the map data does not comprise a traffic indicator associated with the traffic object; and
  associating the traffic object with the map based at least in part on the proposed characteristic.

10. The system of claim 7, the operations further comprising:
detecting the traffic object in third sensor data;
determining a second proposed characteristic of the traffic object;
determining a second representation of the second proposed characteristic to be displayed in the second sensor data;
associating, based on the second representation, a second graphic element with the second sensor data; and
causing the display to display the second graphic element to the user.

11. The system of claim 10, wherein:
receiving the user input comprises:
  receiving first user input rejecting the proposed characteristic; and
  receiving second user input accepting the second proposed characteristic; and
updating the map data comprises:
  one or more of adding or updating the map data to include the traffic object based at least in part on the second proposed characteristic.

12. The system of claim 7, wherein the first sensor data comprises a first image acquired by a first device and the second sensor data comprises an image acquired by a second device.

13. The system of claim 12, wherein:
the first sensor data comprises a first image captured by a first image sensor;
the second sensor data comprises a second image captured by a second image sensor;
the traffic object comprises a traffic light;
the proposed characteristic comprises a proposed position of the traffic light relative to the map data; and
associating the graphical element with the second sensor data comprises projecting the proposed position into the second image based at least in part on an orientation of an image sensor relative to the map data and a second orientation of the second image sensor relative to the map data.

14. The system of claim 7, wherein:
updating map data comprises determining updated map data;
the first sensor data is captured by a device associated with an autonomous vehicle; and
the operations further comprise transmitting the updated map data to the autonomous vehicle, the autonomous vehicle is configured to traverse an environment based at least in part on the updated map data.

15. One or more non-transitory computer-readable media storing processor-executable instructions that, when executed by one or more processors, cause the one or more processors to perform operations comprising:
  detecting a traffic object in first sensor data, the traffic object associated with a traffic object characteristic;
  determining a proposed characteristic of the traffic object in a three-dimensional coordinate system associated with map data;
  determining a representation of the proposed characteristic of the traffic object to be displayed in second sensor data by projecting the proposed characteristic to a two-dimensional position in the second sensor data;
  annotating, as annotated second sensor data and based on the two-dimensional position in the second sensor data, a graphic element;
  causing a display to display the annotated second sensor data to a user; and
  receiving user input; and
  updating the map data, as updated map data, based at least in part on the user input.

16. The one or more non-transitory computer-readable media of claim 15, wherein the user input comprises a confirmation, and
wherein updating the map data comprises:
  determining that the map data does not comprise a traffic indicator associated with the traffic object; and
  associating the traffic object with the map based at least in part on the proposed characteristic.

17. The one or more non-transitory computer-readable media of claim 15, the operations further comprising:
  detecting the traffic object in third sensor data;
  determining a second proposed characteristic of the traffic object;
  determining a second representation of the second proposed characteristic to be displayed in the second sensor data;
  associating, based on the second representation, a second graphic element with the second sensor data; and
  causing the display to display the second graphic element to the user.

18. The one or more non-transitory computer-readable media of claim 17, wherein:
  receiving the user input comprises:
    receiving first user input rejecting the proposed characteristic; and
    receiving second user input accepting the second proposed characteristic; and
  updating the map data includes:
    one or more of adding or updating the map data to comprise the traffic object based at least in part on the second proposed characteristic.

19. The one or more non-transitory computer-readable media of claim 15, wherein
  the first sensor data comprises a first image captured by a first image sensor of a first device and the second sensor data comprises a second image captured by a second image sensor of a second device;
  the traffic object comprises a traffic light;
  the proposed characteristic comprises a proposed position of the traffic light relative to the map data; and
  associating the graphical element with the second sensor data comprises projecting the proposed position into the second image based at least in part on an orientation of the second image sensor relative to the map data and a second orientation of the second image sensor relative to the map data.

20. The one or more non-transitory computer-readable media of claim 15, wherein the first sensor data is captured by a device associated with an autonomous vehicle, and
  wherein the operations further comprise transmitting the updated map data to the autonomous vehicle, the autonomous vehicle configured to traverse an environment based at least in part on the updated map data.

* * * * *